US012785819B2

(12) United States Patent
Castro et al.

(10) Patent No.: US 12,785,819 B2
(45) Date of Patent: Nov. 3, 2026

(54) FAULT MANAGED POWER OVER OPTICAL NETWORK CHANNELS

(71) Applicant: Panduit Corp., Tinley Park, IL (US)

(72) Inventors: Jose M. Castro, Naperville, IL (US); Yu Huang, Orland Park, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 254 days.

(21) Appl. No.: 18/808,685

(22) Filed: Aug. 19, 2024

(65) Prior Publication Data

US 2025/0096908 A1 Mar. 20, 2025

Related U.S. Application Data

(60) Provisional application No. 63/546,552, filed on Oct. 31, 2023, provisional application No. 63/538,552, filed on Sep. 15, 2023.

(51) Int. Cl.

*H04B 10/80* (2013.01)
*H02H 1/00* (2006.01)
*H02J 13/12* (2026.01)
*H02J 13/13* (2026.01)
*H04L 12/10* (2006.01)

(52) U.S. Cl.

CPC ......... *H04B 10/808* (2013.01); *H02H 1/0007* (2013.01); *H02J 13/12* (2026.01); *H02J 13/1313* (2026.01); *H02J 13/1323* (2026.01); *H04L 12/10* (2013.01)

(58) Field of Classification Search

CPC ................ H04B 10/808; H02J 13/1323; H02J 13/1313; H02J 13/12; H02H 11/0007; H04L 12/10

USPC ........................................................ 398/115

See application file for complete search history.

(56) References Cited

U.S. PATENT DOCUMENTS 6,784,790 B1 8/2004 Lester
7,371,014 B2 * 5/2008 Willis .................. G02B 6/4204 385/24
8,358,893 B1 * 1/2013 Sanderson ........... G02B 6/4415 385/115
8,781,637 B2 7/2014 Eaves
(Continued)

FOREIGN PATENT DOCUMENTS

CN 104617573 A 5/2015
CN 110829396 A 2/2020
(Continued)

OTHER PUBLICATIONS

Qin Lei, et al. "Unified Space Vector Pwm Control For Current Source Inverter", Energy Conversion Congress and Exposition (ECCE), 2012 IEEE, IEEE Sep. 15, 2012 (Sep. 15, 2012), pp. 4696-4702, XP032467013, DOI: 10.1109/ECCE.2012.6342181, ISBN: 978-1-4673-0802-1, Section III. Pulse-Width-Amplitude-Modulation (PWAM); figures 11, 13,15.

*Primary Examiner* — Dalzid E Singh
(74) *Attorney, Agent, or Firm* — Peter S. Lee; Christopher S. Clancy; James H. Williams

(57) ABSTRACT

A solution is disclosed for providing fault-managed power systems using hybrid connectivity that includes both conductive and optical elements. The fault-managed power systems are able to provide safe and efficient power delivery utilizing optical fiber links to improve signal integrity, security, and reach of the system.

20 Claims, 12 Drawing Sheets

(56) References Cited

U.S. PATENT DOCUMENTS

| | | | |
|---|---|---|---|
| 8,880,917 B2 | 11/2014 | Kreiner et al. | |
| 9,184,795 B2 | 11/2015 | Eaves | |
| 9,419,436 B2 | 8/2016 | Eaves et al. | |
| 9,787,090 B2 | 10/2017 | Hikihara et al. | |
| 9,853,689 B2 | 12/2017 | Eaves | |
| 9,893,521 B2 | 2/2018 | Lowe et al. | |
| 10,374,423 B2 | 8/2019 | Ibrahim et al. | |
| 10,374,424 B2 | 8/2019 | Zhyhinas et al. | |
| 10,468,879 B2 | 11/2019 | Eaves | |
| 10,541,543 B2 | 1/2020 | Eaves | |
| 10,714,930 B1 | 7/2020 | Weiss et al. | |
| 10,735,105 B2 | 8/2020 | Goergen et al. | |
| 10,790,997 B2 | 9/2020 | Jones et al. | |
| 10,855,381 B2 * | 12/2020 | Sipes, Jr. | H04L 12/10 |
| 11,061,456 B2 | 7/2021 | Jones et al. | |
| 11,063,630 B2 | 7/2021 | Arduini et al. | |
| 11,258,520 B2 | 2/2022 | Goergen et al. | |
| 11,482,351 B2 * | 10/2022 | Horvath | H02M 3/1582 |
| 11,923,678 B2 * | 3/2024 | Potterf | H02H 5/12 |
| 2002/0038154 A1 | 3/2002 | Zimmermann et al. | |
| 2002/0046276 A1 | 4/2002 | Coffey et al. | |
| 2006/0038672 A1 * | 2/2006 | Schoettle | G05B 23/0221 340/522 |
| 2008/0106241 A1 * | 5/2008 | Deaver | H02J 3/1828 323/209 |
| 2012/0217808 A1 | 8/2012 | Richardson et al. | |
| 2014/0225436 A1 | 8/2014 | Lester et al. | |
| 2016/0034416 A1 | 2/2016 | Chavez et al. | |
| 2016/0294500 A1 | 10/2016 | Chawgo et al. | |
| 2016/0294568 A1 | 10/2016 | Chawgo et al. | |
| 2017/0279443 A1 | 9/2017 | Morimoto | |
| 2018/0313886 A1 | 11/2018 | Mlyniec et al. | |
| 2019/0342011 A1 * | 11/2019 | Goergen | H02H 1/0007 |
| 2020/0020382 A1 | 1/2020 | Stoneham | |
| 2020/0235949 A1 | 7/2020 | Jones et al. | |
| 2020/0295559 A1 | 9/2020 | Eaves et al. | |
| 2020/0295955 A1 | 9/2020 | O'Brien et al. | |
| 2020/0389329 A1 | 12/2020 | Jones et al. | |
| 2021/0044145 A1 * | 2/2021 | Hazani | G01R 19/16571 |
| 2021/0063447 A1 | 3/2021 | Eaves | |
| 2021/0075419 A1 | 3/2021 | Manjrekar et al. | |
| 2021/0135890 A1 | 5/2021 | Arduini et al. | |
| 2021/0167813 A1 | 6/2021 | Arduini et al. | |
| 2021/0167814 A1 | 6/2021 | Arduini et al. | |
| 2021/0273564 A1 | 9/2021 | O'Brien et al. | |
| 2021/0294402 A1 | 9/2021 | Jones et al. | |
| 2022/0116122 A1 | 4/2022 | Goergen et al. | |
| 2022/0116238 A1 | 4/2022 | O'Brien et al. | |
| 2022/0190587 A1 | 6/2022 | Eaves et al. | |

FOREIGN PATENT DOCUMENTS

| | | | |
|---|---|---|---|
| CN | 112075053 | A | 12/2020 |
| EP | 2282616 | A1 | 2/2011 |
| EP | 2432134 | A1 | 3/2012 |
| EP | 3726719 | A1 | 10/2020 |
| EP | 3414808 | B1 | 5/2022 |
| JP | 2005020873 | A | 1/2005 |
| JP | 2007018581 | A | 1/2007 |
| WO | 2019171271 | A1 | 9/2019 |
| WO | 2021092350 | A1 | 5/2021 |

* cited by examiner

803

804

FAULT MANAGED POWER OVER OPTICAL NETWORK CHANNELS

CROSS-REFERENCE TO RELATED APPLICATION(S)

The application claims benefit to both U.S. Provisional Patent Application No. 63/546,552, filed on Oct. 31, 2023, and U.S. Provisional Patent Application No. 63/538,552, filed on Sep. 15, 2023, the entirety of all of which are hereby incorporated by reference herein.

TECHNICAL FIELD

The application relates to the field of fault-managed power systems using a hybrid cable including both conductive wire and optical fiber elements.

BACKGROUND

Enterprise networks traditionally use unshielded twisted pair (UTP) copper cables such as CAT 6, and power-over-Ethernet, (POE), for power and data transmission between network devices. However, copper infrastructure confines the network distances to 100 m and has reached the point where achieving efficient transmission at data rates beyond 10G over 100 m of the copper cable becomes challenging and, in some cases, impractical.

Optical networks can provide secure and virtually limitless bandwidth for very long distances that can cover the requirement of premises and campus networks from core to access layers. Also, due to the high bandwidth, power consumption per transmitting bit and latency are significantly lower than UTP channels. Optical systems are broadly deployed in the access, metro, core, and data centers networks providing unmatched bandwidth capacity. Optical networks support wired and wireless applications, access and such as distributed high-speed access points (picocells, femtocells), interconnects, high-resolution security cameras, and distributed audio/video using 4K 8K display systems, among others. While optical fiber can efficiently transmit data at high data rates over longer distances, it cannot efficiently transmit the power needed to energize equipment.

Electrical power is often not always readily available at the end device location, which either requires installing power infrastructure or transmitting power to the desired site. Although it could be advantageous to transmit data and power over optical fiber, existing technology for transmission of power over optical signal is still immature.

Class 4 Power (C4P) is an efficient fault-managed power system whose functionalities and requirements have been recently included in the latest versions of the National Electrical Code (NEC) and, underwriters' Laboratories, documents, UL 1400-1 and UL 1400-2. C4P utilizes higher voltage than traditional power over Ethernet, up to 450 V, enabling more efficient transmission of power.

C4P can energize several communication, computing, and switching devices such as distributed antenna systems (DAS), passive optical LAN (POL), active zone switches, access points, 5G antennas, remote access cabinets, and small cells. This technology can simplify the deployment of networks and edge devices in enterprise facilities such as airports, stadiums, and other venues, hospitality, warehouses, manufacturing plants, and offices.

SUMMARY

Disclosed herein are apparatuses and methods for C4P that employ hybrid systems that utilize cables that include both optical fiber and conductive wires to improve the reach and signal integrity of the controlling and monitoring signals to facilitate the deployment of point-to-point or multidrop topology. The use of optical fiber with C4P fault-detection systems provides excellent signal integrity for the control/monitoring signals due to low attenuation, EMI immunity, and zero crosstalk while making the channels less susceptible to malicious attacks.

Disclosed is a fault-management power system module comprising power transmitters; and power receivers incorporated in network devices such as switches, access points, cameras, or servers, wherein the power transmitters and power receivers include high and low voltage power sources, sensors and ADCs, wherein DC electrical fault-managed power transmission over hybrid connectivity is enabled, wherein the control and monitoring signals required by the fault-managed power system use the same transceivers and optical fiber network of the hybrid connectivity that is used for traditional data communication, wherein the bandwidth utilization of the fault-management system is less than 0.005% of port bandwidth wherein the optical fibers operate in multimode or single mode regime.

Disclosed is a fault-management power method for a DC power delivery system, the method comprising analyzing measurements from at least four redundant circuits that sense and digitalize electrical parameters such as voltage and current, wherein the sensing and digitalization circuits are distributed between the power transmitter and the power receiver, where the power transmitter and power receiver communicate using the same optical transceiver and optical fiber used for the network data communication, where the differences between electrical parameters measured at the power transmitter side and the power receiver side are verified at intervals that depends on the transmitted voltage, where the power delivery stops when the different measurements of the electrical parameters from each sensor are beyond a specific tolerance limit, or when the measurement signals are not received in time.

Disclosed is a fault-management power system for DC electrical power transmission over hybrid (optical/electrical) networks, wherein the control and monitoring signals of the system utilize a small portion of the optical spectrum, wherein the optical fibers utilized are made of glass or plastic designed to operate in multimode or single mode regime, wherein the system is designed for bidirectional communication, e.g., using one or two wavelengths to transmit and receive the information, over the same fiber, wherein, both the system is designed to verify and cover single fault conditions in the safety-critical circuits.

Disclosed is a fault-management power system comprising a module that includes high voltage and low voltage DC power sources, electrical switches, processors, and analog to digital converter, wherein the fault-management power system module has electrical, analog, and digital interfaces that enable simple incorporation to a switch, or network device, wherein the fault-management power system module utilize switch communication functions to transmit and receive control and monitoring signals required by the fault-managed power system through the same transceivers and optical fiber network infrastructure, wherein the bandwidth utilization of the fault-management system is less than 0.005% of port bandwidth wherein the optical fibers operate in multimode or single mode regime.

A detailed description of these and other non-limiting exemplary embodiments of the C4P system is set forth below together with accompanying drawings.

DETAILED DESCRIPTION

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

Power Ethernet, PoE, technologies are widely deployed in enterprise networks to transmit power and data to wireless access points (WAPs), IP security cameras, lighting, computers, and HVAC controls, among many other devices over Unshielded Twisted Pair, UTP, cables. However, copper connectivity has reached the point where achieving efficient transmission at data rates beyond 10G, or distances over 100 m becomes impractical.

Hybrid cables constructed by combining optical fibers and conductive (e.g., copper) wires, can provide both the bandwidth and reaches for high-speed access points, Distributed Antenna Systems (DAS), switches, ultra-high definition and high-speed security cameras 4K/8K display systems, and future applications. However, current methods for deploying hybrid systems are far from producing the clean and organized structured cabling systems of the UTP ecosystem.

Figure 1:
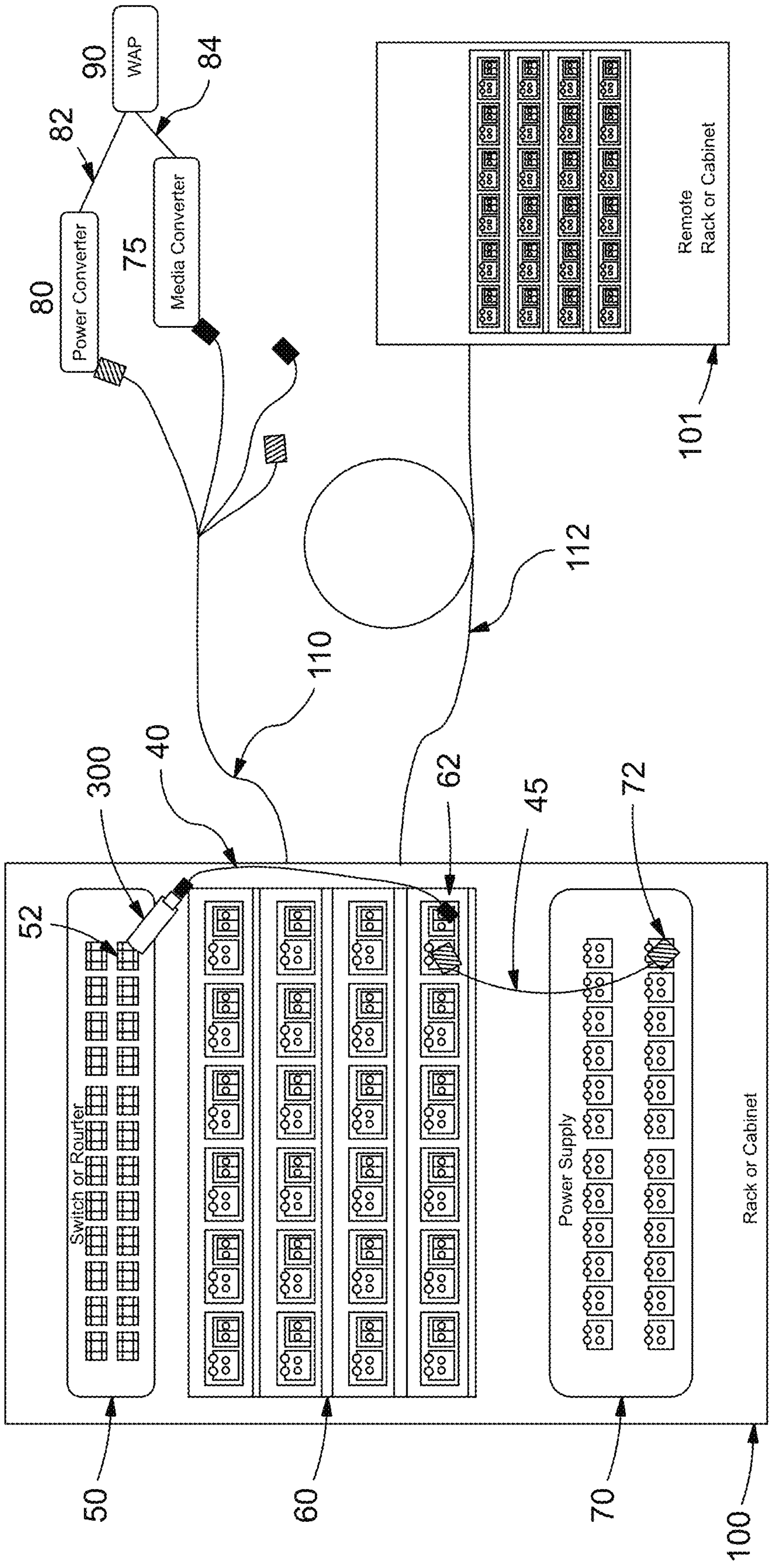
FIG. 1 is a system block diagram of an exemplary hybrid fault management system, according to some embodiments.

FIG. 1 depicts a hybrid connectivity setup: Rack 100 houses a switch 50 including host cages 52 that engage to optical transceiver 300 of various forms, e.g., SFP, QSFP, SFP+, QSFP-DD, a hybrid patch panel 60 with front hybrid ports 62, and rear connections to trunk cables 110 and 112 and a multi-port power supply 70 including one or more ports (e.g., Phoenix or Euroblock among other types).

In current hybrid networks, many intermediary connections are required to transmit power and data to remote devices. For example, from switch 50, an optical transceiver 300 in port (corresponding to host cage 52) connects to port 62 of hybrid patch panel 60 using an optical fiber patch cord 40, and port 72 from power supply 70 connects to the electrical port on the side of the patch panel hybrid port 62. From the back of the patch panel 60, a hybrid cable 110 that has multiple fibers and copper conductors is used to transport power and provide communication to the WAP 90.

These prior embodiments of an optical-electrical hybrid connectivity method requires careful selection pairing and labeling, and grouping of the electrical and optical ports, from switch 50 and from power supply 70. Scaling this network to full utilization of the ports is complex and far from producing the clean and organized structured cabling systems of the UTP ecosystem. Moreover, for safety reasons, the voltage of current hybrid systems is constrained, e.g., <60 V, requiring bulky copper cables 110 and 112 to transmit the power.

These prior optical-electrical hybrid systems are complex and bulky challenging to scale and have an increased risk of failure as utilization grows. The hybrid system disclosed here enables safe and efficient power transmission over smaller-diameter cables. The system uses circuits and algorithms for fault-managed power delivery from a power transmitter inside a switch to a power receiver in a client device.

Unlike earlier approaches that utilized specialized optical transceivers to send control and data signals for fault-managed power systems, the hybrid system described herein utilizes existing Ethernet connections in the host switch. This facilitates an easier integration of fault-managed power systems with the network and enables precise monitoring of the power and data consumed by specific client's media access control (MAC) addresses in the network.

Figure 2:
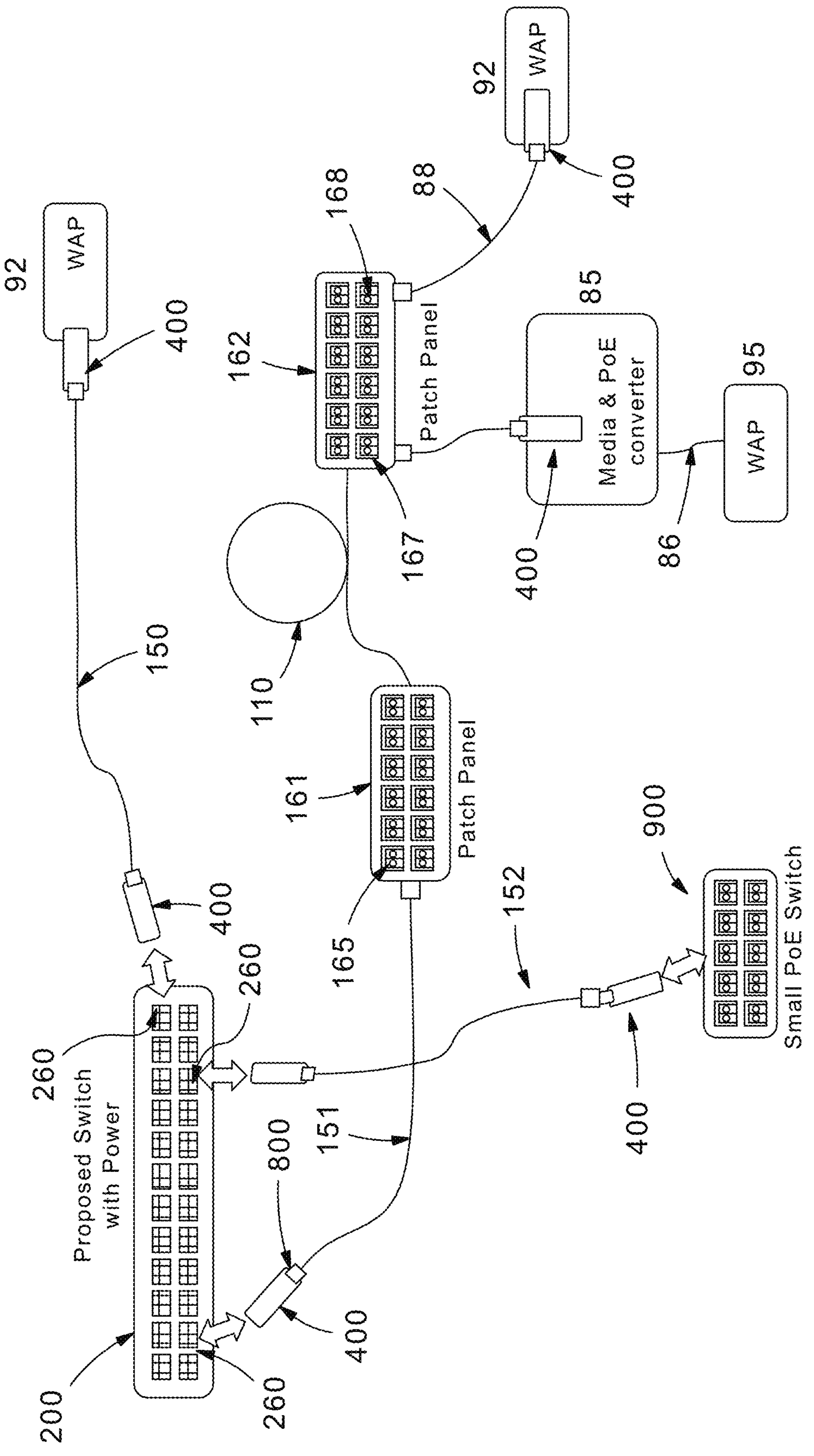
FIG. 2 is a system block diagram of an exemplary hybrid fault management system, according to some embodiments.

FIG. 2 depicts the novel hybrid network comprising switches 200 and 900, an access point 92, and a media and power converter 86, that have at least one host cage 260 compatible with traditional pluggable transceivers 300 and with special hybrid pluggable transceivers 400 of several form factors e.g., SFP, QSFP, SFP-DD, QSFP-DD, or OSFP. The host cage 260 have traditional control, power, and communication lanes specified in [1-4], and additional lanes for enabling the new fault-managed power functions required in the proposed hybrid network that engages to internal circuits of the hybrid transceivers 400 when inserted in the host cage 260. If a traditional transceiver 300 is inserted in the host cage 260, the traditional transceiver 300 operates as a traditional transceiver which is only capable of data transmission/reception without fault-managed power capabilities.

The hybrid transceiver 400 includes a hybrid media-dependent interface (MDI) 800 that can interface to hybrid cables 150, 151, and 152. For example, the hybrid transceiver 400 placed in host cage 260 is connected to hybrid cable 150, which sends data and power to the hybrid transceiver 400 inserted in the host cage 260 of a WAP, 92.

In the same configuration, another host cage 260 populated by the hybrid transceiver 400 connects to hybrid cable 151. The hybrid cable 151 connects multiple power and cable lanes to the hybrid patch panel 161, which can distribute the signals locally or to a remote patch panel such as 162 that connects to a media, and a power converter that provides PoE to a WAP 95, that does not have host cage 260.

Another port corresponding to the host cage 260 of switch 200, populated with the hybrid transceiver 400, may transmit data and power to a remote switch 900 using hybrid cable 152. The remote switch 900 may, for example, be optimally located in a network to serve multiple cubicles in offices with power and high bandwidth communication.

Figure 3:
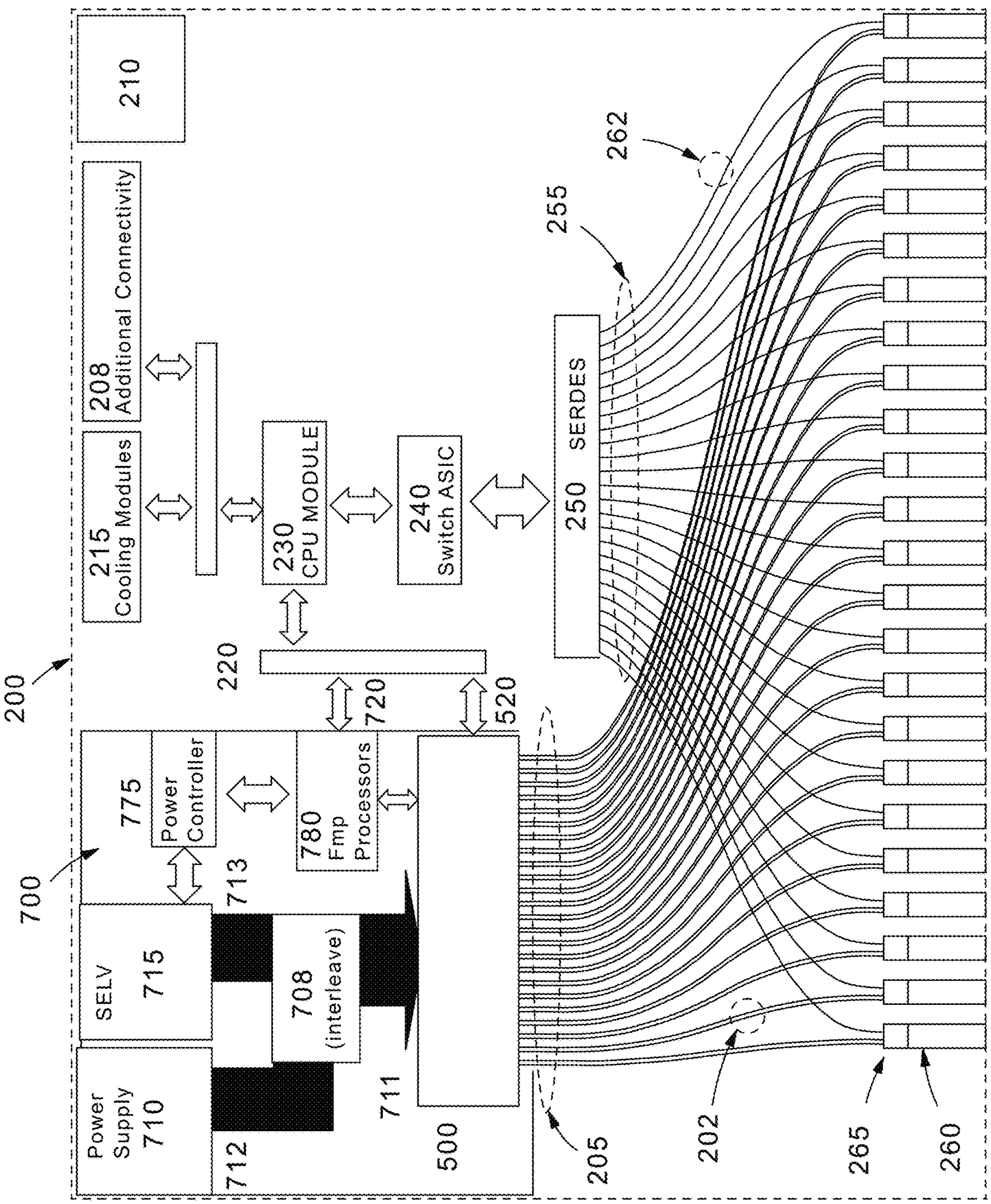
FIG. 3 is a block diagram of an exemplary switch module that may be included in the hybrid fault management system shown in FIG. 2, according to some embodiments.

FIG. 3 provides details of the functional modules of the switch 200 that may be configured to be capable of operating as a standard switch as well as a fault-managed power system. The switch 200 has one or more power supplier unit (PSU) 210, which may be used to energize critical circuits of the switch 200 such as the CPU module 230. The CPU module 230 may include, for example, a processor, one or more controllers, and a memory. A switch ASIC 240 may be configured to perform the core switching functions. The switch ASIC 240 may come in various types, including high-bandwidth ones with capacities of 51.2 Tbps, primarily for data centers. In many cases, the switch ASIC 240 may be a lower bandwidth ASIC, e.g., 12.5 Tbps capacity, offer flexibility and simpler programmability, making them better suited for the applications in this disclosure. A SERDES module 250 (Serializers/Deserializers) provides digital signal processing DSP functions to equalize the transmitted signal from the ASIC 240 to host cages 260, which is transmitted through one or more of the lanes 262 that are included in a set of lanes 255. Other exemplary modules of the switch 200 are shown in FIG. 3, such as the cooling modules 215 and the additional connectivity modules 208.

A power module 700 includes power source units (PSUs) 710 with a programmable current limiter and Safety Extra Low Voltage source (hereinafter the SELV 715) used to provide safe power, e.g., 48V, required to power circuits that need to operate during an initialization or fault recovery process. PSU 710 provides N output ports, e.g., 712, where N is equal to or greater than the number of host cages 260, and a capacity of several kilowatts. The ports of the PSU 710 range from 712-1*a*/712-1*b* to 712-Na/712-Nb, where a and b represent the electrical polarity of the lane.

SELV 715, which may only be used during initialization or troubleshooting, may have lower power capacity, distributed into N outputs. The ports of the SELV 715 range from 713-1*a*/713-1*b* to 713-Na/713-Nb.

Figure 4:
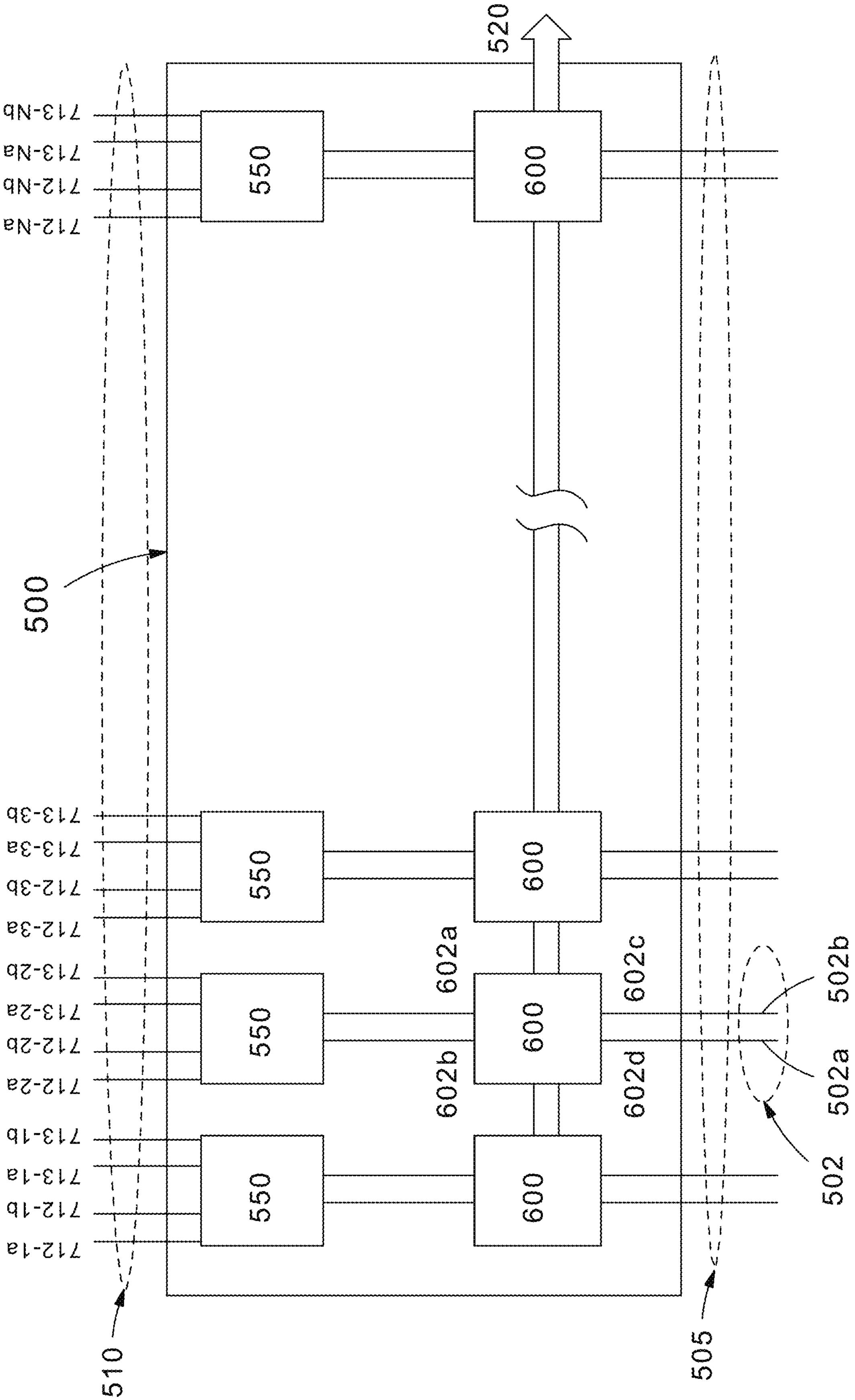
FIG. 4 is a block diagram of an exemplary switch module included in a power module of the switch shown in FIG. 3, according to some embodiments.

The power module 700 may also include a switch module 500 comprising N electrical switches 550 and N modules 600 as shown in FIG. 4.

The ports 712 and 713 of PSUs from PSUs 710 and SELV 715, respectively, are connected to circuit 708, which reassigns their lanes to produce a set of interleaved pairs of lanes (bus 711) that connect to the switch module 500. More specifically, the interleaved lanes from 708, for example, 712-2*a*/712-2*b* (PSU 710), and 713-2*a*/713-2*b* (SELV 715), connect to electrical switch 550 included in the switch module 500. The electrical switch 550 selects the power source PSU 710 or SELV 715, to be used to energize the remote system based on the process stage: initialization or operation. For example, for the second electrical switch 550 in FIG. 4, lane {602*b*, 602*a*} connects either with {712-2*a*, 712-2*b*} or {713-2*a*, 713-2*b*}.

Figure 5:
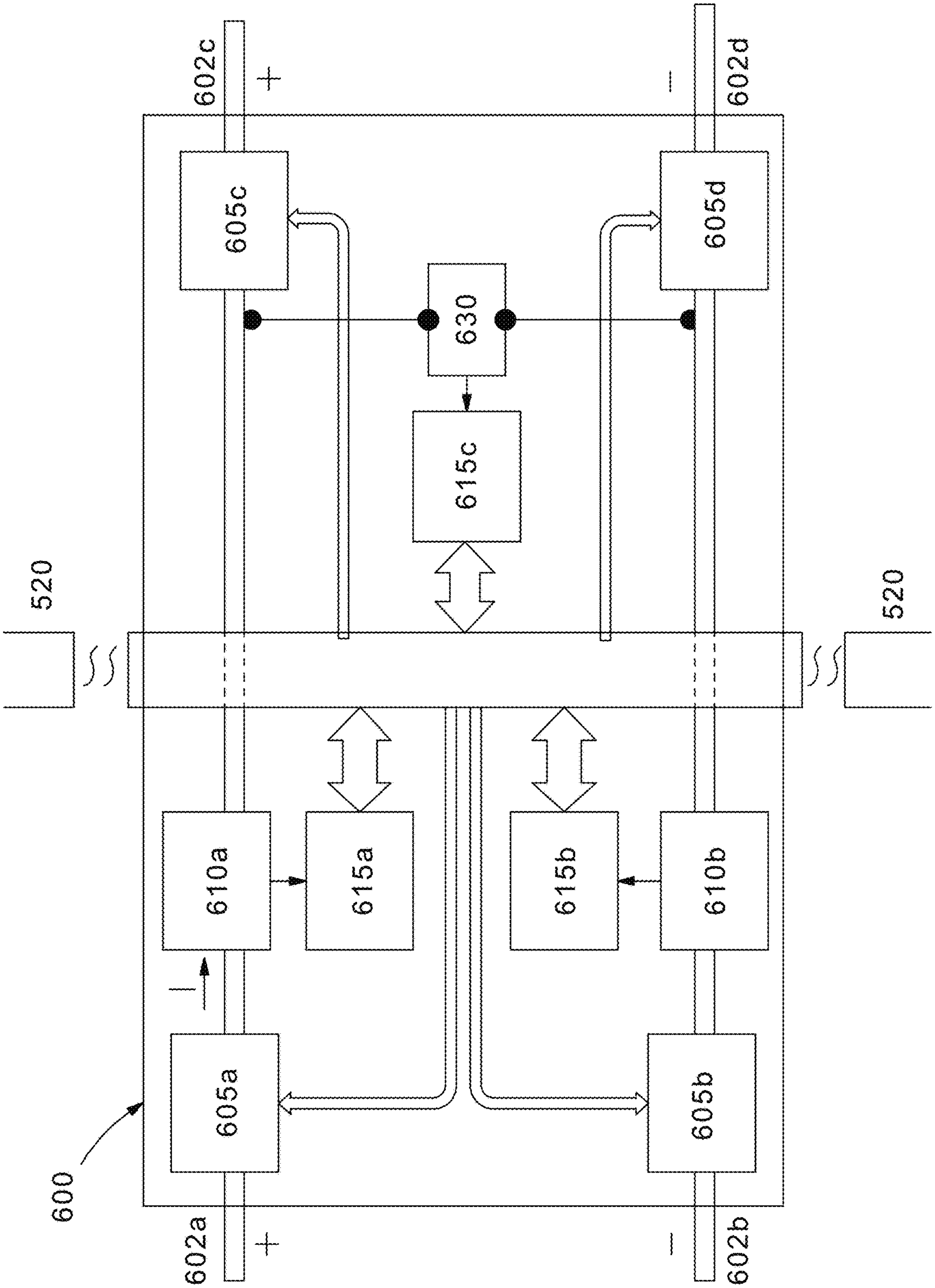
FIG. 5 is a block diagram of an exemplary sensing module included in the switch module shown in FIG. 4, according to some embodiments.

As shown in FIG. 5, each module 600 includes electrical switches 605, current sensors 610, analog-to-digital converters, ADCs 615, and voltage sensor 630. There are two electrical switches per lane polarity to improve the reliability and safety of the connection. The switches 605 are controlled by the processor 780 via internal electrical lanes or electrical bus 520. Only when all the switches 605*a*, 605*b*, 605*c*, and 605*d* are ON, the electrical power can be transmitted to cage 260.

Current sensor 610 includes a calibrated low-impedance load placed in series with the lane and connected to an electrical amplifier. During operation, the calibrated load produces a voltage proportional to the circulating current in each lane, which is amplified and then digitalized by the ADC 615. For each lane, there are two ADCs 615*a* and 615*b* to digitalize the currents. Another ADC 615*c* is used to digitalize the voltage sensing from 630. Those ADCs are connected to data/control bus 520, which interfaces with data/control bus 220 of switch 200.

The processor 780 executes the connection initialization and also manages the fault-managed power algorithms.

Figure 6:
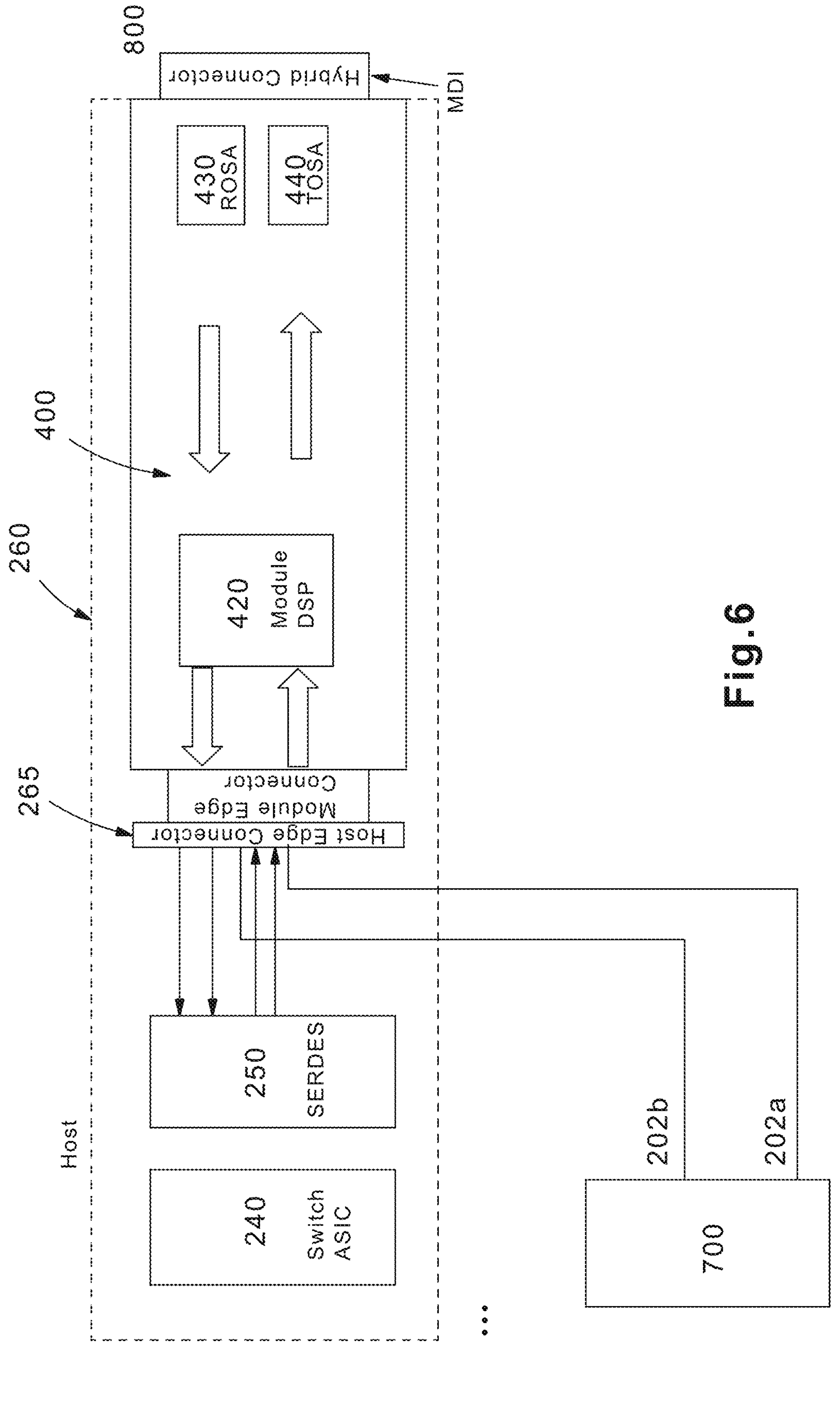
FIG. 6 is a top view of a transceiver printed circuit board included in the hybrid fault management system shown in FIG. 2, according to some embodiments.
Figure 7:
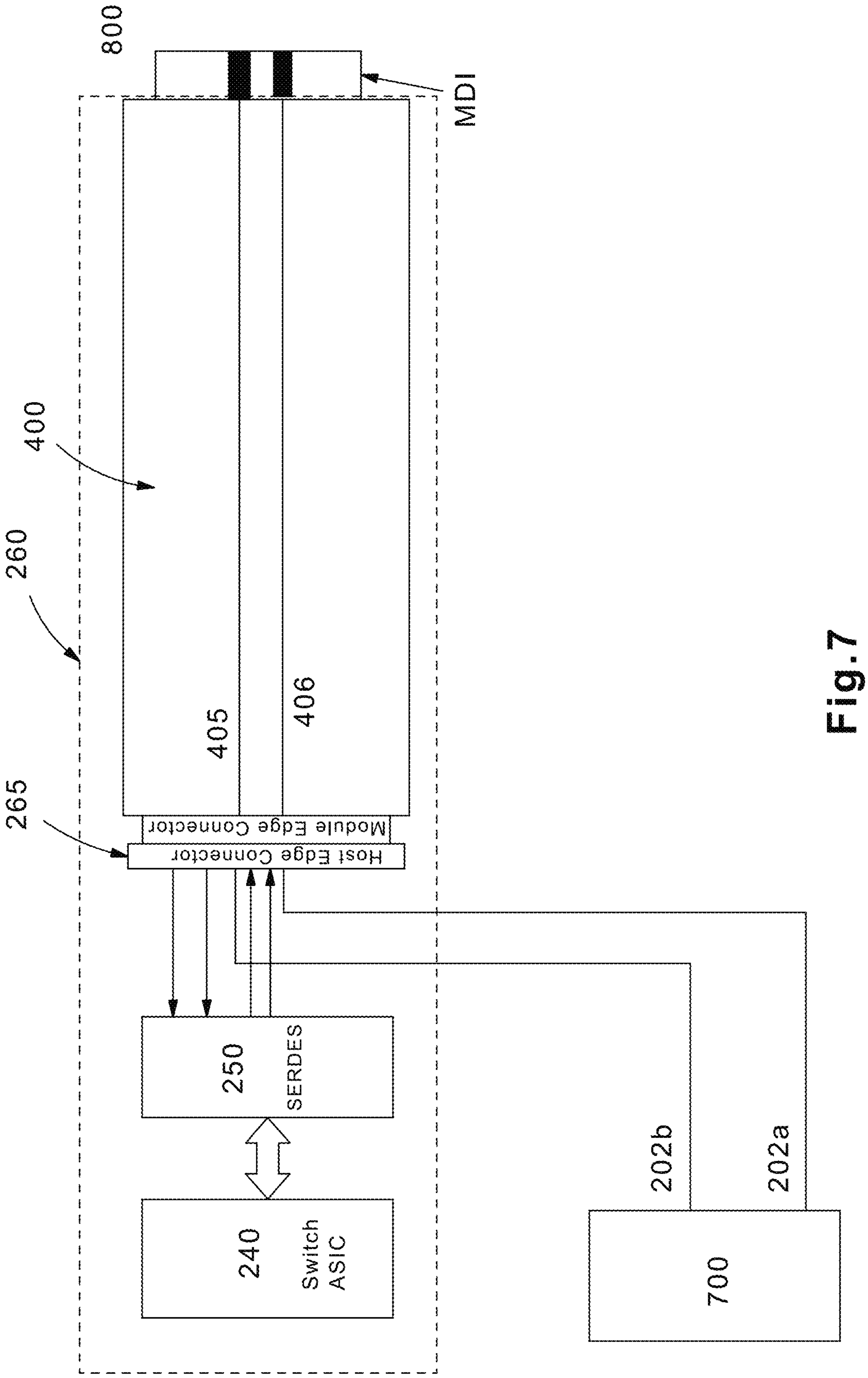
FIG. 7 is a bottom view of the transceiver printed circuit board included in the hybrid fault management system shown in FIG. 2, according to some embodiments.

FIGS. 6-7, shows schematics of the hybrid transceiver 400 that may be inserted in the hybrid host cages 260. FIG. 6 shows a top view of a transceiver printed circuit board (PCB) included in the hybrid transceiver 400, where the SERDES module 250 is configured to transmit and receive electrical signals from/to the switch ASIC 240 to/from the transceivers 400 using edge connectors 265 with lane configuration defined in standards, such as [1-4].

FIG. 7 shows a bottom view of the transceiver PCB included in the hybrid transceiver 400, including two electrical lanes 202*a* and 202*b*, that are configured to energize additional lanes of the host edge connector 265, when the safety conditions described in this application are met. In other embodiments (not shown here) the transceiver includes an additional module 600.

Traditional optical transceivers 300 connect to fiber optic cabling via the media-dependent interface (MDI) which links transmitter and receiver assemblies to fiber connectors like LC, SN, and MPO. Duplex connections often use two fibers (e.g., duplex LC connectors) for transmitting and receiving, while systems like PON use a single fiber for both directions.

Figure 8A:
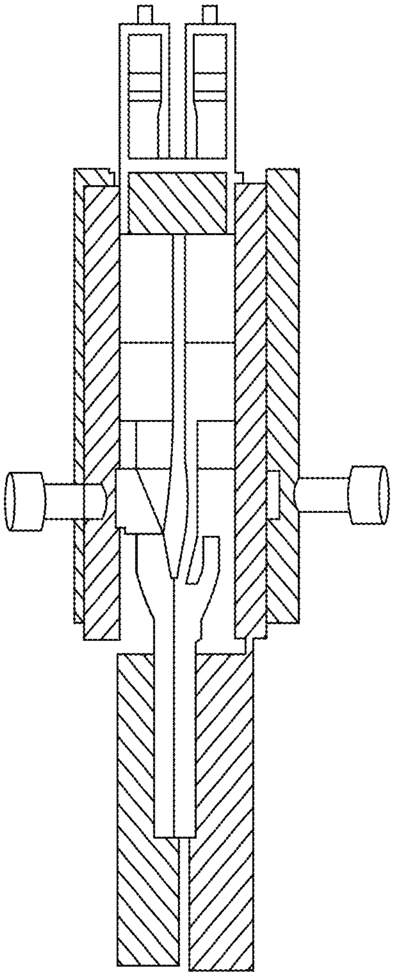
FIG. 8A is a first exemplary compact hybrid connector, according to some embodiments.
Figure 8B:
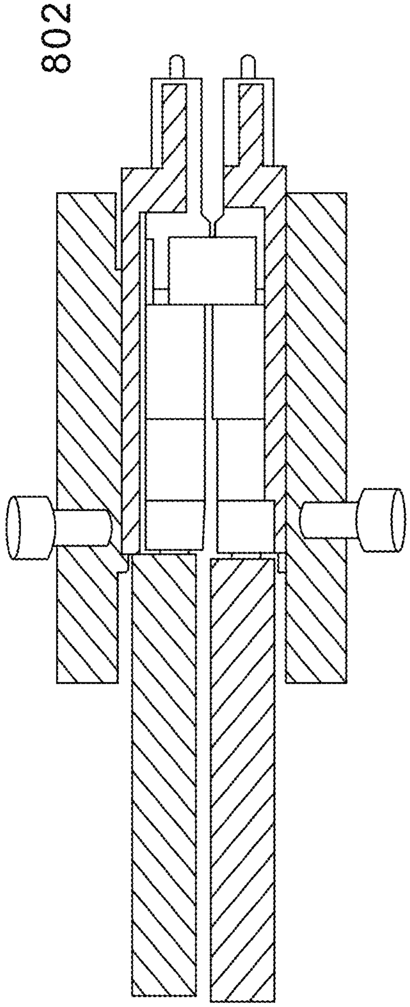
FIG. 8B is a second exemplary compact hybrid connector, according to some embodiments.
Figure 8C:
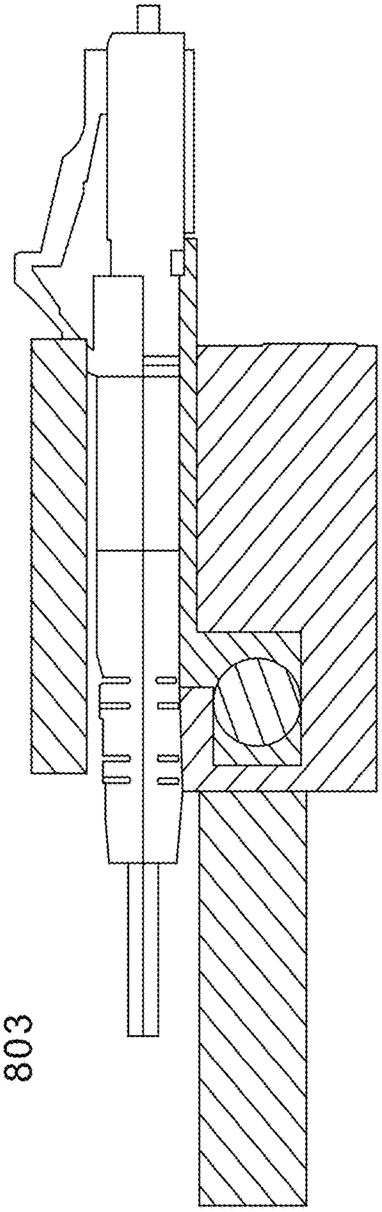
FIG. 8C is a third exemplary compact hybrid connector, according to some embodiments.
Figure 8D:
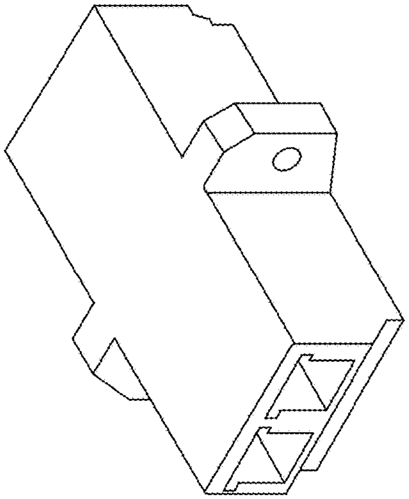
FIG. 8D is a fourth exemplary compact hybrid connector, according to some embodiments.

Different from 300, the disclosed hybrid transceiver 400 uses hybrid MDI 800 implemented as simplex or duplex configurations. FIG. 8A shows an first exemplary compact hybrid connector 801 using duplex LC connectors/adapters with electrical lanes outside the body of the LC, FIG. 8B shows a second exemplary compact hybrid connector 802 using duplex LC connectors/adapters with electrical lanes outside the body of the LC, FIG. 8C shows a third exemplary compact hybrid connector 803 using duplex LC connectors/adapters with electrical lanes outside the body of the LC, and FIG. 8D shows a fourth exemplary compact hybrid connector 804 using duplex LC connectors/adapters with electrical lanes outside the body of the LC.

Fault Managed Method

Figure 9:
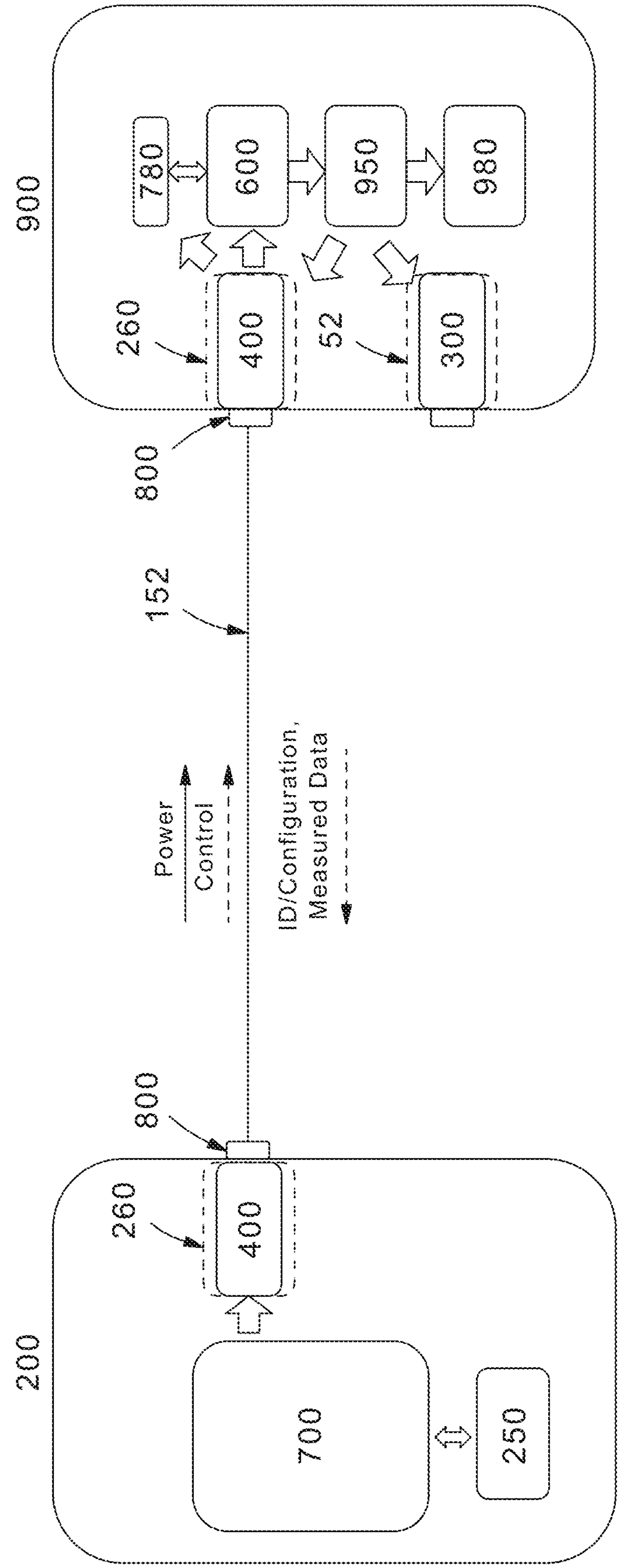
FIG. 9 is a block diagram of an exemplary hybrid fault management system, according to some embodiments.

FIG. 9 illustrates the operation of the fault-management power system over a hybrid Ethernet Network, depicting a point-to-point connection from switch 200 to a remote switch 900.

Initialization Method

During initialization, processor 780 verifies that the electrical switch ports 550 are connected to the SELV 715 and that the hybrid transceiver 400 was inserted in a specific host cage 260. If the transceiver is determined to have been properly inserted, the processor 780 turns on switches 605 of the module 600 inside the switch module 500 that connects a port of the SELV 715 to the chosen host cage 260. On the remote side, the power received by the hybrid transceiver 400 (inserted in host cage 260 of the switch 900) energizes the transceiver and remote processor 780. The remote processor 780 turns on switches 605 of module 600 inside the switch 900 and connects to module 950. During the initialization process, the module 950 terminates the circuit with an impedance, Rt.

Figure 10:
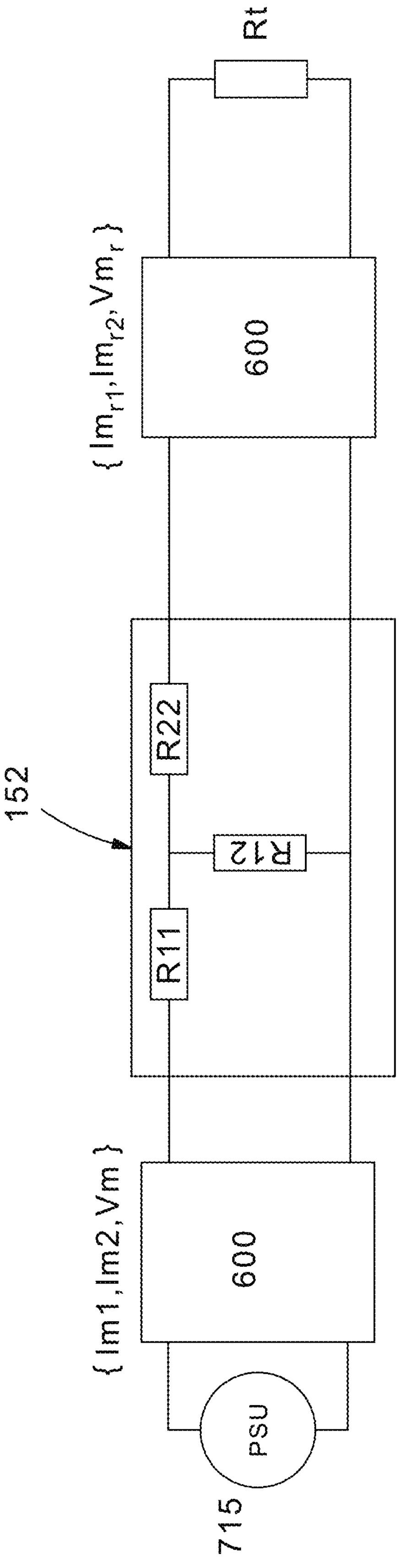
FIG. 10 is a circuit diagram, according to some embodiments of the present disclosure.

A simplified equivalent circuit after module 950 termination is shown in FIG. 10. In FIG. 10, the SELV 715 provides a safe voltage enough to energize the modules needed during initialization. The local and remote connectors (e.g., hybrid MDI 800), and copper wires of hybrid cable 152 are represented by a two-port network. The current and voltage parameters measured by local module 600 are {$Im_1$, $Im_2$, Vm}, measured by sensors 610*a*, sensor 610*b* sensor 630 respectively. The current and voltage parameters measured by remote module 600 are {$Im_{r1}$, $Im_{r2}$, $Vm_r$}. Those are digitalized by their respective ADCs 615 and sent to their respective processors. The remote processors 780 of the switch 900 transmit their measured data after encapsulating them in a small Ethernet frame to their respective ASICs 240 through management or without encapsulating them to other available ports.

The ASICs 240 of switch 900 transmit an Ethernet frame with a set of several measurements of current and voltage with respective time stamps to the hybrid transceiver 400 inserted in host cage 260. The Ethernet frame is transmitted to the hybrid transceiver 400 of switch 200 using the optical fiber of hybrid cable 152. That data is recovered by ASIC 240 and sent to processor 780 of switch 200.

The measurements of the client device, e.g., switch 900, are compared with measurements from the power server, e.g., switch 200. Assuming that ΔIt is an acceptable tolerance of the current sensors, and Vd is an acceptable voltage drop for the used voltage of the SELV, the following equations must be satisfied to consider the channel healthy to initiate the full power transmission.

$$\mathrm{Abs}(Im_1 - Im_2) \leq \Delta It \tag{1}$$

$$\mathrm{Abs}(Im_{r1}, -Im_{r1}) \leq \Delta It \tag{2}$$

$$\mathrm{Abs}(Im_1, -Im_{r1}) \leq \Delta It \tag{3}$$

$$\mathrm{Abs}(Im_2, -Im_{r2}) \leq \Delta It \tag{4}$$

$$(Vm - Vm_{r2}) \leq Vd \tag{5}$$

In those equations, Abs ( ) represents the absolute value function. Note that the specified Vd needs to be scaled from the voltage drop specified during operation, which uses higher voltage source in the PSU 710, instead of SELV 715. The measured Vd can be used to estimate the length of the cable when the gauge of the cable is provided. Also, since Rt is known during initialization, parameters of the cable such as R11, R22, and R12 can be estimated. All this information may help monitor the channel during operation.

The required tolerances ΔIt to detect a fault in the systems, can be computed following criteria defined in UL-1400-1 assuming human worst case human body resistance and fault current limit curves threshold (illustrated in FIG. 12*a*). Those tolerances can be used to specify the tolerances of the calibrated resistor in sensor 610 and the required ADC resolution.

Operation of the fault-management power requires that the channel satisfies the requirements from equations (1-5). Once this is confirmed after several iterations during the initialization time, the power needed from the client, e.g., switch 900 is communicated through the Ethernet channel. If switch 200 is capable of providing that power, it sends a confirmation Ethernet frame to the client. At this time, the operation and monitoring process starts.

Operation and Monitoring Method

Before starting the fault-managed power delivery, processor 780 of switch 200 commands the electrical switch 550 to connect to PSU 710. During the normal operation, continuous measurements of {$Im_1$, $Im_2$, Vm} at switch 200 and {$Im_{r1}$, $Im_{r2}$, $Vm_r$} at the client side, e.g., switch 900 are performed and digitalized by the ADCs 615 at intervals Tm. The parameters of the client, are transmitted using a small packet or Ethernet frame from the client, e.g., switch 900 to power server, e.g., switch 200 at intervals Tc, where Tc≥3×M×Tm, and M is the number of measurements per ADC being transmitted per frame.

The process continues as long as data frames or packets (e.g., Ethernet frames) with the client measurements are received on time, at intervals equal to or smaller than Tc, and while requirements described by eq. (1-5) are met. The client or power server can request disconnection for other reasons such as when power is no longer needed, or it requires to be assigned to another device.

If channel requirements are not met, at the switch 200 sides, processor 780 opens switches 605*a* and 605*b* and commands the electrical switch 550 to connect to the SELV 715. Depending on how large the departure from operational conditions described in equations (1-5), was, the system will pause and try to start the initialization process described above.

The reaction time, Tr, defined as the time required to disconnect the source after a fault occurs, includes Tm, the measured time, Tc, which is the time to transmit the measured parameters {$Im_{r1}$, $Im_{r2}$, $Vm_r$}, the processing time, Tp, which comprises compliance evaluation of equations (1-5), estimation of trends, and the disconnection time, Td, (turning off the switches). In general, Tr=Tm+Tc+Tp+Td+Tl where Tl is an additional delay caused by the non-deterministic nature of traditional networks such as Ethernet. In the past latency studies of traditional Ethernet found that for point-to-point connections delay variations are common but unlikely to be longer than 2 ms even in a fully utilized network. More recently, the evolution of Ethernet networking technology incorporating Sensitive Networking (TSN) has further reduced the delay variations.

Figure 11:
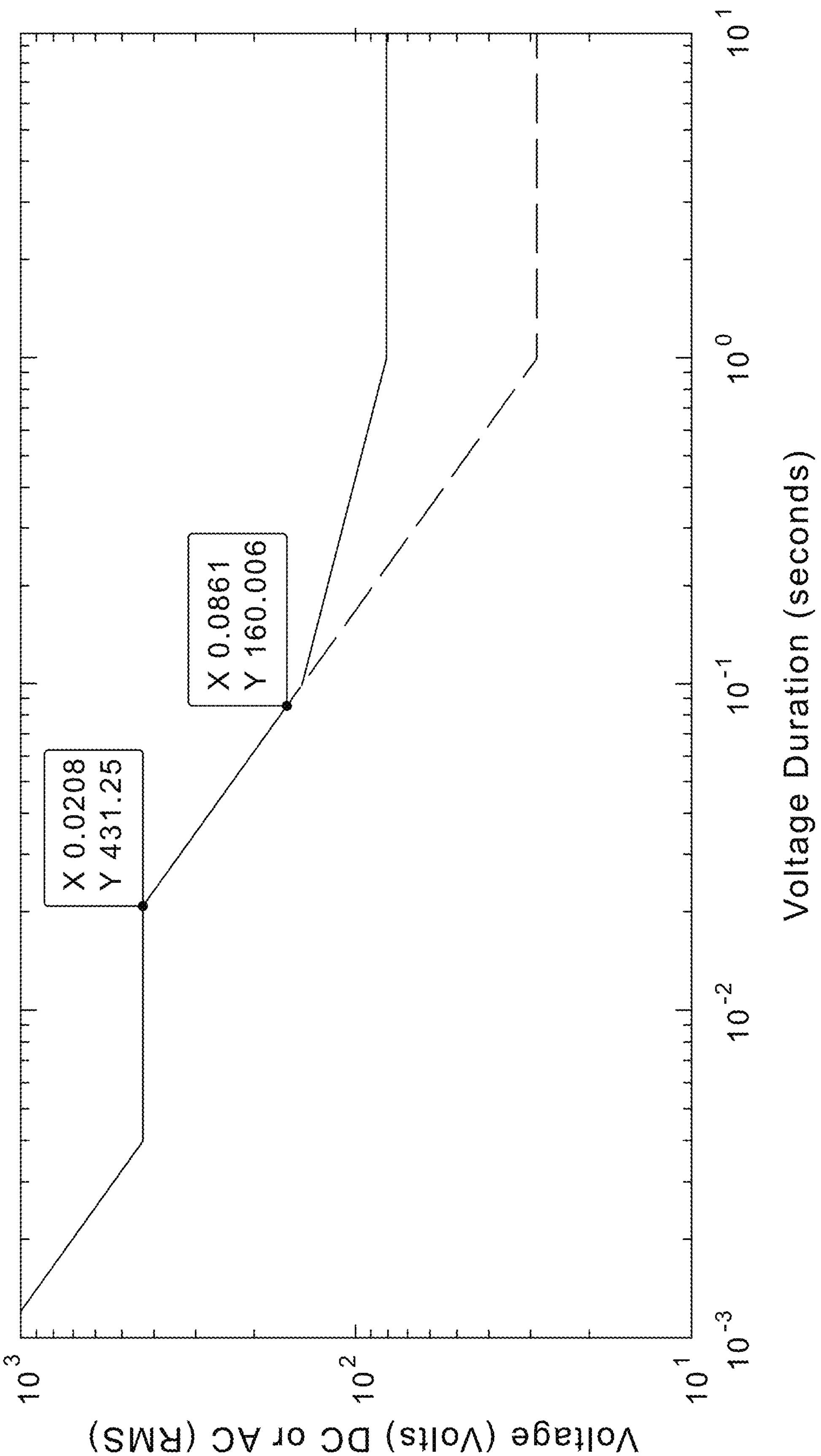
FIG. 11 is a graph depicting a relationship between voltage duration and voltage, according to some embodiments.

In a fault-managed power system, Tr, has to be lower than the maximum allowable exposure time, Te shown in FIG. 11. This Te curve may be estimated based on UL-1400-1 assuming a worst-case human body resistance of 575 ohms.

Since the present disclosure utilizes the same optical channel to transmit data from devices and measurement data of the fault-managed power system, it is important to evaluate a potential degradation of the channel bandwidth.

To illustrate the maximum Tc allowable for safety, it may be assumed that Tm=5 ms, Tp+Td=1 ms, Tl=4 ms (higher than expected 2 ms) and use Te vs voltage curves shown in FIG. 11 for two voltages 430 V DC and 160 V DC. Te for those voltages is 20.9 ms and 72 ms respectively. The described ADCs may be 10 bit-ADCs and the hybrid cable may be capable of transmitting 2 Amps DC, enabling up to 800 W (430V) or 300 W (160V) fault-managed power transmission per a hybrid port corresponding to the host cage 260, depending on the distance and size of the conductors. The disclosed two power modes, 800 W (430V) or 300 W (160V) may be provided for exemplary purposes.

With those values, it may be estimated Tc≤10 ms for a transmitted voltage of 430V DC and Tc≤62 ms for 160V. Therefore, the bandwidth required by the fault-managed power systems, using a 64 Bytes Ethernet frame with 48 Bytes payload which can accommodate several measurements of the sensors including time stamps, the bandwidth is less than 52 Kbps for the 430V case and less than 8.3 Kbps for 160V.

Considering that the port speed is at least 10 Gbps, the fault management power system utilization of the network is negligible (<0.001%). Even for 1 Gbps which is not preferred for the application, it can be lower than 0.01%. Therefore, the disclosed method enables simultaneously the operation of the fault management power operation system while maintaining virtually a full capacity for data communication over the same optical port.

The present disclosure thus describes systems, devices, and methods for implementing a class 4 fault managed DC power system associated with the current approaches described above. As is readily apparent from the foregoing, various non-limiting embodiments of the systems, devices, and methods for implementing a class 4 fault managed DC power system have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A power transmitter included as part of a fault-managed power system, the power transmitter comprising:
- a low voltage source;
- an electrical switch port coupled to the low voltage source;
- a hybrid transceiver;
- a switch for coupling the low voltage source to the hybrid transceiver;
- a host cage structure;
- a processor; and
- a memory in communication with the processor, the memory including executable instructions that, when executed by the processor, causes the processor to:
  - verify the low voltage source is coupled to the electrical switch port;
  - determine the hybrid transceiver is inserted into the host cage structure, and close the switch to couple the low voltage source to the hybrid transceiver based on the determination;
  - obtain local diagnostic data on the power transmitter, the local diagnostic data including at least a local current measurement and a local voltage measurement;
  - control transmission of low voltage power from the hybrid transceiver to a remote hybrid transceiver included in a remote network device, the low voltage power being transmitted via conductive wires of a hybrid cable connecting the hybrid transceiver to the remote hybrid transceiver;
  - receive, via an optical fiber of the hybrid cable, remote diagnostic data from the remote hybrid transceiver, the remote diagnostic data including at least current measurements and voltage measurements from the remote network device;
  - compare the local diagnostic data with the remote diagnostic data, and determine the compared diagnostic data are within predetermined acceptable tolerances; and
  - control transmission of high voltage power from the power transmitter to the remote network switch over the conductive wires of the hybrid cable based on the determination that the compared diagnostic data are within the predetermined acceptable tolerances.

2. The power transmitter of claim 1, wherein the predetermined acceptable tolerances includes at least staying below an acceptable current limit as detected by current sensors on the power transmitter and current sensors on the remote network device.

3. The power transmitter of claim 1, wherein the predetermined acceptable tolerances includes at least staying below an acceptable voltage drop across the low voltage source as detected by voltage sensors on the power transmitter and voltage sensors on the remote network device.

4. The power transmitter of claim 1, wherein non-diagnostic data is also transmitted via the optical fiber of the hybrid cable concurrently with the transmission of the remote diagnostic data over the optical fiber of the hybrid cable.

5. The power transmitter of claim 1, wherein the transmission of the remote diagnostic data over the optical fiber of the hybrid cable utilizes a bandwidth of less than 0.005% of a port bandwidth capability.

6. The power transmitter of claim 1, wherein the power transmitter is included in a network device, the network device being one of a network switch, a network access point, a network connected camera, or a network server.

7. The power transmitter of claim 1, wherein the fault-managed power system meets requirements for Class 4 power systems and complies with UL Standard 1400-1.

8. The power transmitter of claim 1, wherein error free communication between the power transmitter and the receiver via the optical fiber of the hybrid cable is achieved for over at least 10 km when the hybrid cable uses single-mode fiber.

9. The power transmitter of claim 1, wherein the high voltage power is at least 1 kW.

10. The power transmitter of claim 1, wherein the high voltage power is transmitted in a pulsed power form.

11. The power transmitter of claim 1, wherein the high voltage power is transmitted in a direct current (DC) power form.

12. The power transmitter of claim 1, the memory further including executable instructions that, when executed by the processor, causes the processor to:
- transmit, via the optical fiber of the hybrid cable, the local diagnostic data to the remote hybrid transceiver.

13. The power transmitter of claim 1, the memory further including executable instructions that, when executed by the processor, causes the processor to:
- transmit, via the optical fiber of the hybrid cable, the local diagnostic data to the remote network device at a first interval while the high voltage power is being transmitted;
- receive, via the optical fiber of the hybrid cable, the remote diagnostic data from the remote network device at a second interval while the high voltage power is being received by the remote network device; and
- control transmission of the high voltage power to cease when the second interval at which the remote diagnostic data is being received from the remote network device falls below a predetermined time limit.

14. The power transmitter of claim 1, the memory further including executable instructions that, when executed by the processor, causes the processor to:

detect a predetermined fault condition; and control the transmission of the high voltage power to cease based on the detected predetermined fault condition, wherein a reaction time for ceasing the transmission of the high voltage power is less than a predetermined reaction time limit.

15. The power transmitter of claim 14, wherein the predetermined reaction time limit is 20.9 ms.

16. The power transmitter of claim 14, wherein the predetermined reaction time limit is 72 ms.

17. The power receiver of claim 1, wherein the predetermined acceptable tolerances includes at least staying below an acceptable voltage drop across the low voltage source as detected by voltage sensors on the power receiver and voltage sensors on the remote network device.

18. A power receiver included as part of a fault-managed power system, the power receiver comprising:

a low voltage source;

an electrical switch port coupled to the low voltage source;

a hybrid transceiver;

a switch for coupling the low voltage source to the hybrid transceiver;

a host cage structure;

a processor; and a memory in communication with the processor, the memory including executable instructions that, when executed by the processor, causes the processor to:

receive, from a power transmitter, a low voltage power via conductive wires of a hybrid cable connecting the hybrid transceiver to a remote hybrid transceiver, the remote hybrid transceiver being included in a remote network device;

control the switch to close and supply the hybrid transceiver included in the power receiver with the low voltage power;

obtain local diagnostic data on the power receiver, the local diagnostic data including at least a local current measurement and a local voltage measurement;

transmit, via an optical fiber of the hybrid cable, the local diagnostic data to the remote hybrid transceiver;

receive, via the optical fiber of the hybrid cable, remote diagnostic data from the remote hybrid transceiver, the remote diagnostic data including at least current measurements and voltage measurements from the remote network device;

compare the local diagnostic data with the remote diagnostic data, and determine the compared diagnostic data are within predetermined acceptable tolerances; and control transmission of an approval message, over the optical fiber of the hybrid cable, to the remote network device, the approval message identifying whether the compared diagnostic data are within the predetermined acceptable tolerances.

19. The power receiver of claim 18, wherein the power receiver is included in a network device, the network device being one of a network switch, a network access point, a network connected camera, or a network server.

20. The power receiver of claim 18, wherein the predetermined acceptable tolerances includes at least staying below an acceptable current limit as detected by current sensors on the power receiver and current sensors on the remote network device.

* * * * *